(12) United States Patent
Campedelli

(10) Patent No.: US 11,046,472 B2
(45) Date of Patent: Jun. 29, 2021

(54) MACHINE FOR CONVEYING CONTAINERS

(71) Applicant: MAKRO LABELLING S.R.L., Mantova (IT)

(72) Inventor: Davide Campedelli, Mantova (IT)

(73) Assignee: MAKRO LABELLING S.R.L., Mantova (IT)

( * ) Notice: Subject to any disclaimer, the term of this patent is extended or adjusted under 35 U.S.C. 154(b) by 0 days.

(21) Appl. No.: 16/644,868

(22) PCT Filed: Sep. 5, 2018

(86) PCT No.: PCT/IB2018/056759
§ 371 (c)(1),
(2) Date: Mar. 5, 2020

(87) PCT Pub. No.: WO2019/049031
PCT Pub. Date: Mar. 14, 2019

(65) Prior Publication Data
US 2020/0283182 A1    Sep. 10, 2020

(30) Foreign Application Priority Data

Sep. 7, 2017  (IT) .................. 102017000100503

(51) Int. Cl.
*B65C 9/04* (2006.01)
*B65G 47/244* (2006.01)
*B65G 54/02* (2006.01)

(52) U.S. Cl.
CPC .............. *B65C 9/04* (2013.01); *B65G 47/244* (2013.01); *B65G 54/02* (2013.01); *B65G 2201/0244* (2013.01)

(58) Field of Classification Search
CPC ........ B65C 9/04; B65G 47/244; B65G 54/02; B65G 2201/0244
See application file for complete search history.

(56) References Cited

U.S. PATENT DOCUMENTS 10,518,987 B2 * 12/2019 Marcantoni ............. B65C 9/045
10,800,616 B2 * 10/2020 Marcantoni ............... B65C 3/06

FOREIGN PATENT DOCUMENTS

| DE | 102011086708 | 5/2013 |
| DE | 102013100627 | 7/2014 |
| WO | 2017103813 | 6/2017 |

\* cited by examiner

*Primary Examiner* — William R Harp
(74) *Attorney, Agent, or Firm* — Workman Nydegger

(57) ABSTRACT

A machine for conveying containers may include a guide, a main carriage for transporting containers slidably mounted on the guide, an auxiliary carriage slidably mounted on the guide, a plate for supporting a container mounted on the main carriage and able to rotate about an axis of the container, an actuator connected to the plate and configured to set the plate in rotation about the axis of the container, a control unit electrically connected to the guide and configured for controlling the sliding of the main carriage and the auxiliary carriage on the guide and a mutual distance thereof. The actuator may include a connecting rod and a crank connected to one another and interposed. The control unit varies the mutual distance between the main carriage and the auxiliary carriage so as to activate the connecting rod and the crank and consequently move the plate.

9 Claims, 6 Drawing Sheets

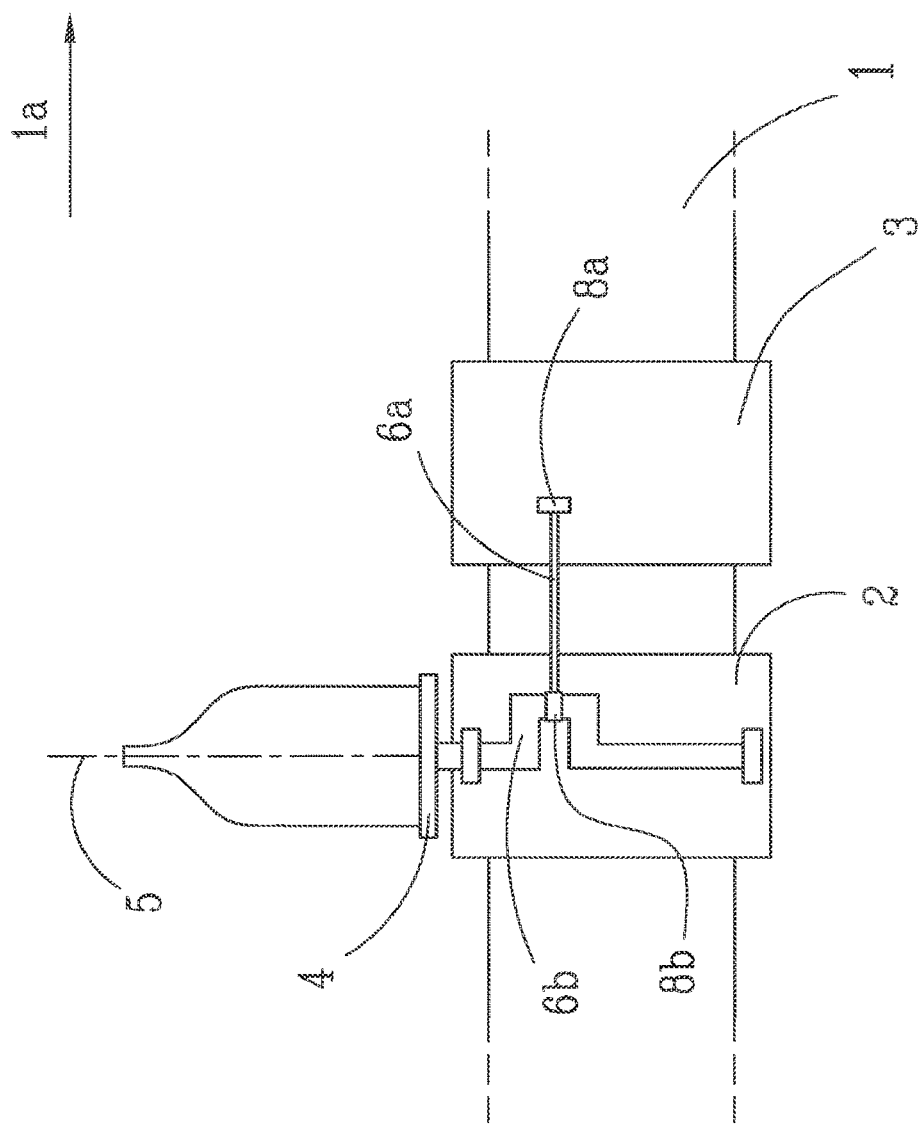

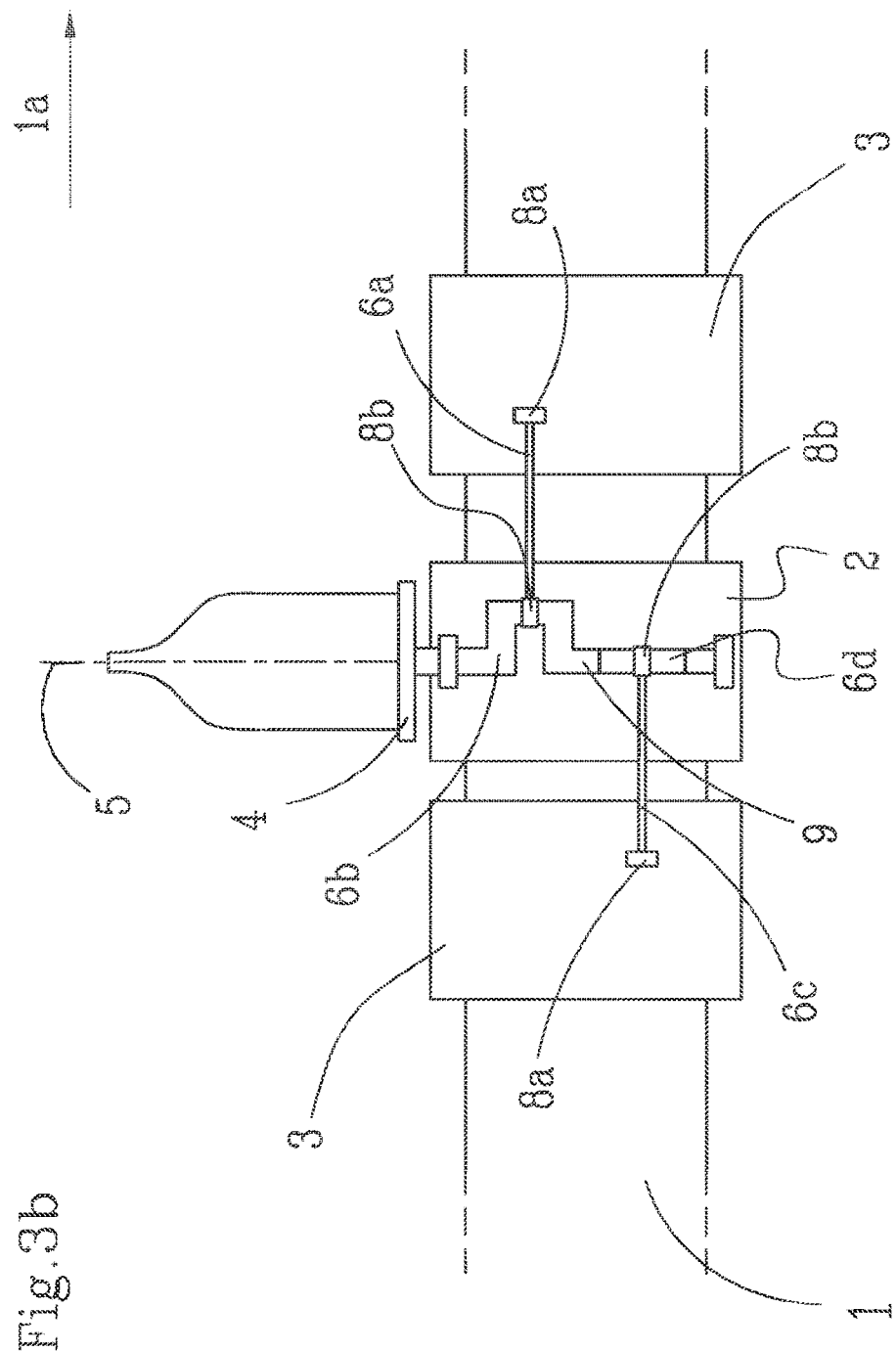

MACHINE FOR CONVEYING CONTAINERS

TECHNICAL FIELD

The present invention relates to a machine for conveying containers. The invention is specifically directed to the movement mechanism of the container support present in machines for conveying containers which use the technology of linear motors.

PRIOR ART

At present, conveying machines used for operating on containers are, at least in the majority, of the rotating carousel type. The carousel has, on a periphery thereof, predefined container supporting stations (commonly defined by a "support plate") on which the containers to be treated are positioned. In particular, the carousel has a central rotation axis and for the support plates has respective rotation axes parallel to the central axis. Each support plate is rotatable about itself by taking the movement mechanically from the rotation of the carousel (for example by means of cam members or another method) or, in the most recent machines, is provided with its own electric motor that is commandable by a controller independently with respect to the rotation of the carousel. In this way the container loaded on the support plate can be rotated according to the operating units arranged along the carousel. For example, in order to carry out labelling operations on the container, it is necessary to perform a preliminary rotation of the container on itself in order to detect the application position of the label (by means of a suitable detecting sensor) in order then to arrange the container in the position prior to or at the labelling unit.

However, the present technology has some drawbacks that the invention seeks to obviate.

In fact, the use of a carousel has the drawback of having to use a number of support plates limited by the dimensions of the carousel itself, which are determined on the basis of the final overall dimensions that the machinery must not exceed. The carousel has a structure that is not very flexible, in which the support plates are positioned at a fixed mutual difference that cannot vary. Further, in order to be able to rotate about an axis thereof the support plates must receive the command signal and the necessary energy, respectively, from a control unit and a current generator located externally with respect to the carousel, which, further, rotates about an axis thereof in order to correctly carry out the required operations. The structure is therefore considerably complicated, as it has to enable both rotation of the carousel and of the support plates, simultaneously guaranteeing the connection by means of electrical circuits thereof with a control unit and with a current generator.

Systems are also known that use a linear motor structure in which the support plate is mounted on a mobile carriage along a guide powered by electric current. In this case, according to patent application WO2017103813 owned by the same applicant, it is possible to impart rotation on the support plate using a rack-and-pinion system installed between a first support carriage of the container and a second auxiliary carriage. The relative movement between these two carriages activates the rack-and-pinion system, which is thus able to impart the rotary movement to the support plate present on the first carriage. However, in order to obtain the torque required to carry out the necessary rotation the overall dimensions of this system increase significantly, consequently reducing the number of support plates available.

SUMMARY

In this context, the technical task of the present invention is to propose a machine for conveying containers, which obviates the drawbacks of the known art as mentioned above. In particular, an object of the present invention is to provide a machine for conveying containers that enables setting in rotation the plate for supporting a container.

A further object of the present invention is the possibility of reducing the complexity of the machine, for example due to the installation of various electric circuits and connected components.

A further object of the present invention is the reduction of the maximum overall dimensions generated by the use of two adjacent supports, while maintaining the torque generated in order to impart a sufficient rotation to the plate constant.

In general, the present invention relates to a machine for conveying containers which comprises a guide extending along an advancement direction of the containers, at least one main carriage for transport of the containers slidably mounted on the guide, at least one auxiliary carriage slidably mounted on the guide, a plate for supporting the base of a container mounted on the main carriage and able to rotate about a main axis of the container itself. The main carriage and the auxiliary carriage, both associated to the guide, respectively define a main linear motor and an auxiliary linear motor. In other words, the two carriages (main and auxiliary) are controllable independently of one another.

The machine further comprises actuating means operatively connected to the plate and configured for setting the latter in rotation about the main axis of the container and a control unit electrically connected to the guide and configured for controlling the sliding of the main carriage and the auxiliary carriage on the guide and a mutual distance thereof by means of imparting predefined currents along the circuits extending along the guide. The control unit is further configured for commanding variation of the mutual distance between the main carriage and the auxiliary carriage in such a way as to activate the actuating means, which comprises at least one connecting rod and at least one crank, generally having a "U"-profile and two appendages along the rotation axis thereof, operatively connected to one another and interposed between the main carriage and the auxiliary carriage.

Substantially, the sliding on a guide of a main carriage and an auxiliary carriage associated thereto is controllable by a control unit, which is programmed for management and variation of the mutual distance thereof, for activating actuating means able to rotate a supporting plate positioned on the main carriage. The use of a connecting rod-crank system enables greater compaction of the components, while preventing the reduction of the torque generated for rotation of the plate.

The crank is preferably mounted on the main carriage and is operatively associated to the plate, while the connecting rod has a first end constrained to the auxiliary carriage and a second end associated to the crank.

It is advantageous to use carriages comprising a magnet, in such a way that the guide, appropriately assembled, can define the stator of a linear motor, in which the carriage defines the rotor. A linear motor advantageously significantly reduces maintenance costs and has a very precise control of the movement of each single rotor, i.e. the speed and the position thereof.

According to an aspect of the invention, the machine comprises a further auxiliary carriage slidably mounted on the guide and the actuating means comprises a further connecting rod and a further crank operatively connected to one another and interposed between said further auxiliary carriage and the main carriage. Note that the two auxiliary carriages are arranged in front of and behind the main carriage according to the advancement direction.

The further crank is preferably mounted on the main carriage and is operatively associated to the plate, while the further connecting rod has a first end constrained to the further auxiliary carriage and a second end associated to the further crank.

Advantageously, the addition of a further auxiliary carriage and, consequently, of a further connecting rod-crank system enables obtaining a torque that is greater and, therefore a greater rotation force of the supporting plate for the containers.

According to an aspect of the invention, the main carriage comprises both the crank and the further crank, both arranged along a same rotation axis, offset from one another by an angle of less than 180° and other than 0°. In this way, each time a connecting rod-crank system becomes positioned in a "dead centre", i.e. when the connecting rod and the crank are aligned along a same axis that is perpendicular to the rotation axis, the other connecting rod-crank system is in a different position so as to guarantee the continuity of the rotation movement of the plate ("endless" movement). The crank and the further crank are preferably offset by an angle of 90° to maximise the interaction between the two connecting rod-crank systems. For rotation of a support plate, the control unit is configured to command the alternating movement of the auxiliary carriages close to/away from the main carriage to which they are associated.

According to a further aspect of the invention, the machine comprises a crankshaft operatively associated to the plate and formed by the crank and the further crank.

The main carriage is preferably interposed between the auxiliary carriage and the further auxiliary carriage, so that the operation of the two connecting rod-crank systems is optimised and the overall dimensions thereof are at minimum.

Alternatively, the auxiliary carriage and the further auxiliary carriage are both arranged downstream or upstream of the main carriage along the aforesaid advancement direction.

According to a further aspect of the invention, in the invention each auxiliary carriage is associated to a main carriage upstream and to a main carriage downstream with respect to the advancement direction of the containers, by means of respective actuating means. Each auxiliary carriage comprises a connecting rod for each main carriage to which it is associated and each of these connecting rods has an end constrained to the above-mentioned auxiliary carriage while the other one is operatively associated to the respective crank present on the associated main carriage.

In this case, the control unit is configured to maintain the mutual distance between the main carriages constant and to vary the distance between each auxiliary carriage, alternatingly of moving close to and away from the main carriage which is located downstream or upstream thereof.

The stated technical task and specified objects are substantially achieved by a machine for conveying containers, which comprises the technical features set forth in the independent claim. The dependent claims correspond to further advantageous aspects of the invention.

BRIEF DESCRIPTION OF THE DRAWINGS

Further characteristics and advantages of the present invention will become more apparent from the general and thus non-limiting description of a preferred, but not exclusive, embodiment of a machine for conveying containers, as illustrated in the accompanying drawings, in which:

FIG. 3a illustrates, in a schematic side view, a first embodiment of the machine of the invention;

In the following description, the same reference characters indicate identical or corresponding parts in the various views.

DETAILED DESCRIPTION

The present invention relates to the technical field of machines for conveying containers, specifically to the movement system of the container supports and the relative simultaneous rotation about a rotation axis thereof.

Figure 1:
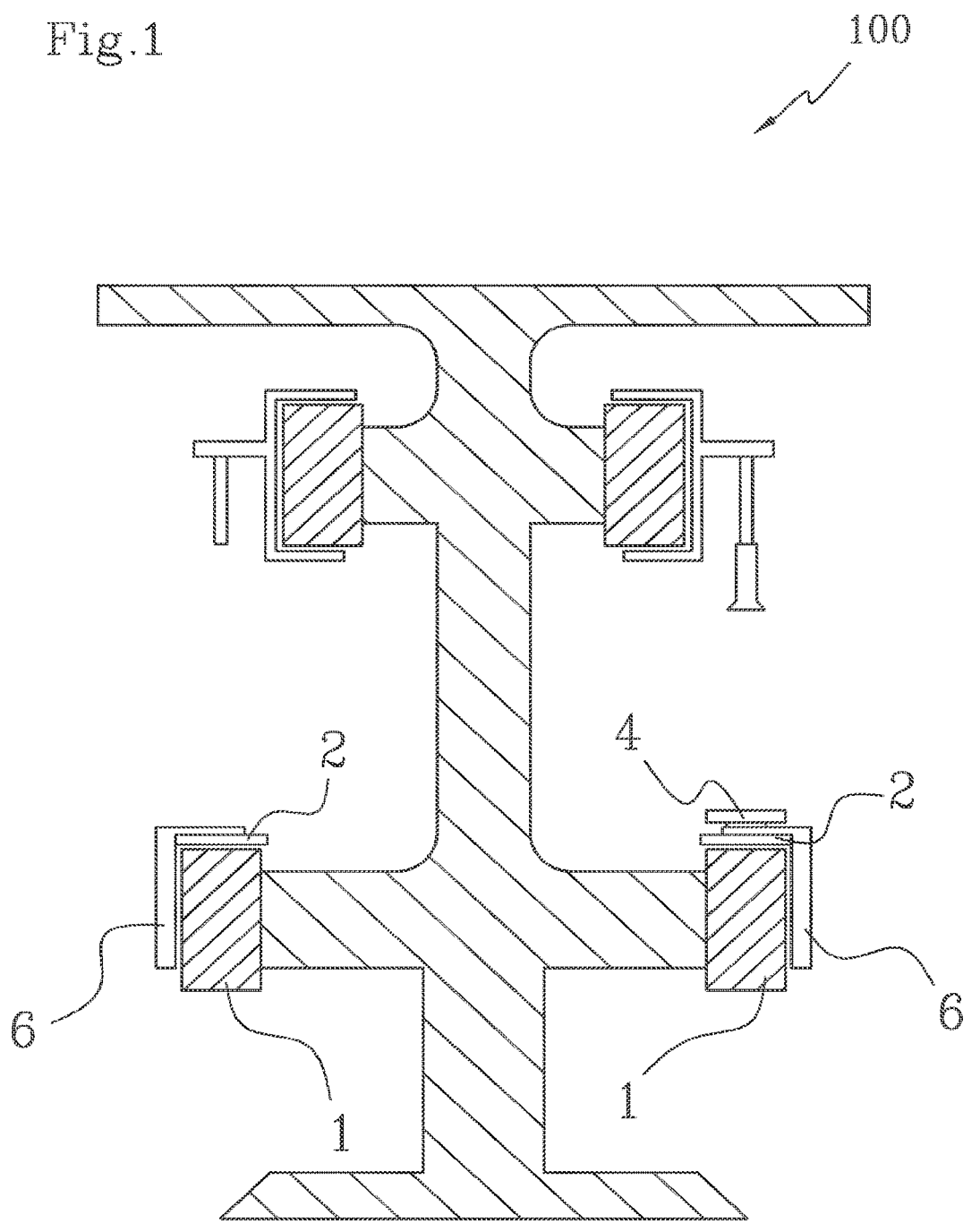
FIG. 1 illustrates, in a schematic front view, a machine for conveying containers.

With reference to the cited figures, reference numeral 100 denotes in its entirety a machine for conveying containers, as shown in FIG. 1.

Figure 2A:
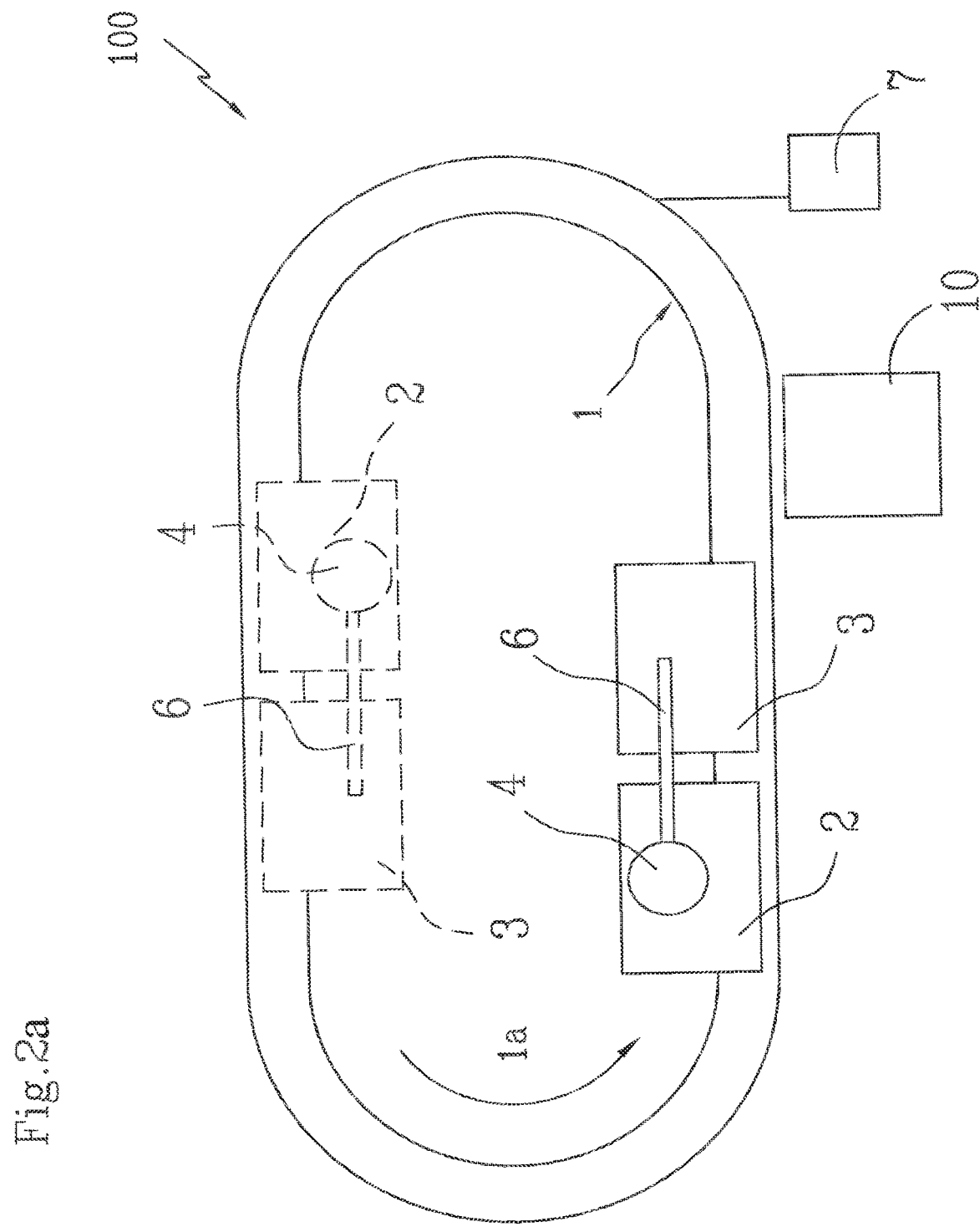
FIG. 2a illustrates, in a schematic top view, the sliding guide of the carriages for transport of the containers

FIG. 2a shows, with a schematic top view, a guide 1 which extends along an advancement direction 1a of the containers and on which at least one main carriage 2 and at least one auxiliary carriage 3 are mounted. The guide 1 can be made up of a plurality of tracks that are substantially parallel along which the various carriages are arranged, or of a single track electrically connected to a single control unit 7 for better management of the movement of the main carriage 2 and of the auxiliary carriage 3.

In the case of a plurality of tracks, the carriages mounted thereon are controllable independently, and the auxiliary carriage 3 is mounted on a different track with respect to the main carriage 2 so that the auxiliary carriage 3 can operate laterally with respect to the main carriage 3.

The guide 1 comprises a plurality of electrical windings and is electrically connected to a control unit 7 able to control the supply of electric current precisely by a generator, for induction of a specific magnetic field. The main carriage 2, equipped with a magnet or produced with a ferromagnetic material or conductor, defines a linear motor together with the guide 1 supplied with electric current, in which the guide 1 acts as a stator and the main carriage 2 as a rotor. Likewise, the auxiliary carriage 3, provided with a magnet or produced from a conductor material, defines together with the guide 1 a linear motor, where in this case too the guide 1 is the stator and the auxiliary carriage 3 is the rotor.

The control unit 7 is programmed for a precise control of the electric current to be supplied to a specific portion of the guide 1, in such a way that the latter generates a specific magnetic field for a precise movement of the main carriage 2 and/or of the auxiliary carriage 3. In fact, it is possible to control the position and velocity of each single carriage, so that on the passage in proximity of the operating station 10, for example a labelling station, the carriages move with an adequate velocity for carrying out the necessary operations.

The main carriage 2 is the carriage for transport of containers, having on a top thereof a plate 4, usually having a circular shape, on which the containers can be positioned. The plate 4 is able to rotate about a main axis 5 of the supported container, which is perpendicular to the rest surface of the plate 4 and usually passing through the centre thereof. Further, the plate 4 is axially constrained (neither rises nor lowers) at least during the rotation thereof about the main rotation axis 5. The plate 4 is preferably axially constrained in every condition (including while it is not rotating).

The auxiliary carriage 3 is usually lacking in the plate 4 and is positioned upstream or downstream of the main carriage 2, with respect to the advancement direction 1a of the containers. The auxiliary carriage 3, in fact, has the function of accompanying the movement of the main carriage 2 in order to impart the rotary motion to the plate 4.

Figure 2B:
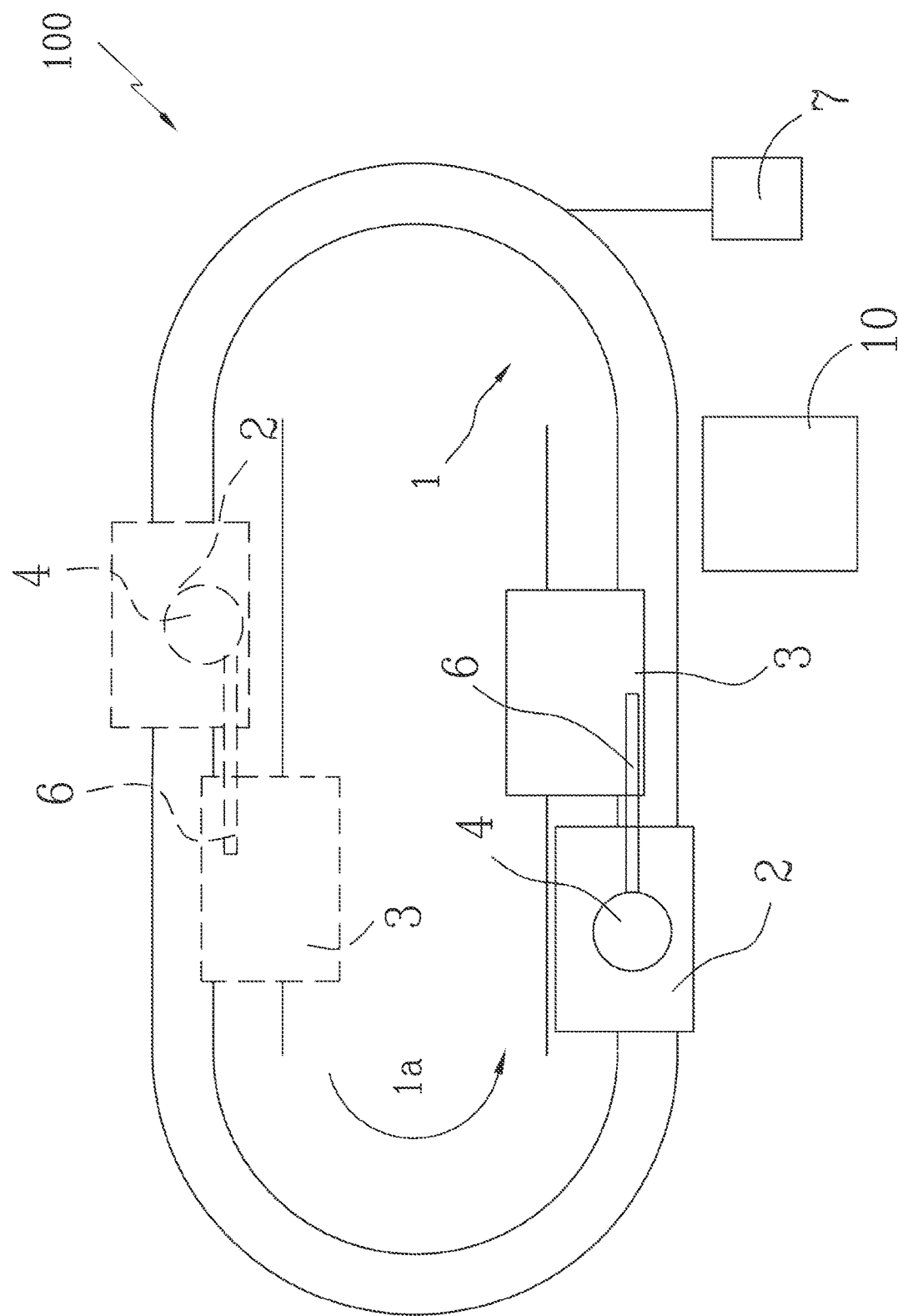
FIG. 2b illustrates that the guide includes parallel tracks.
Figure 4A:
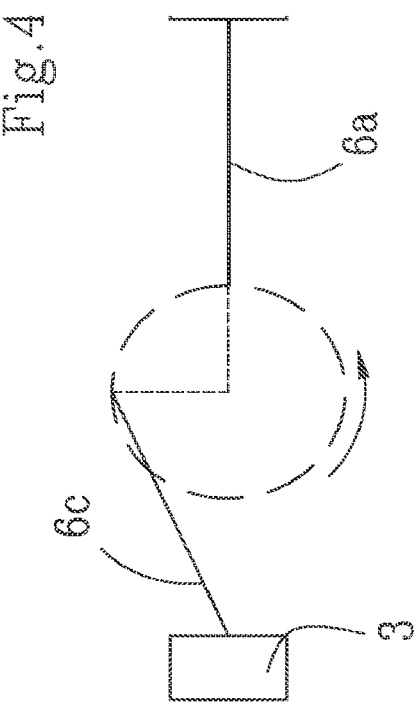
FIGS. 4a to 4d illustrate, in a schematic top view, various steps of the movement of the connecting rod-crank system of the invention.
Figure 4:
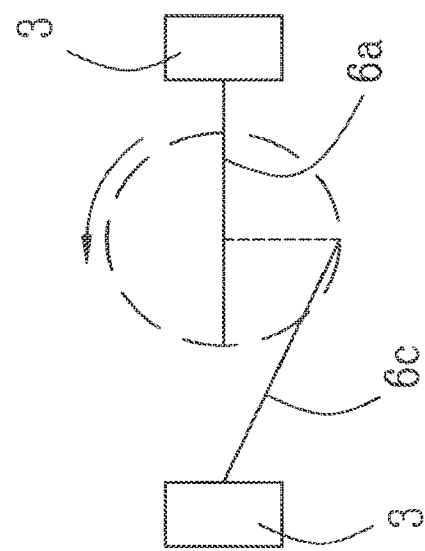
Figure 4C:
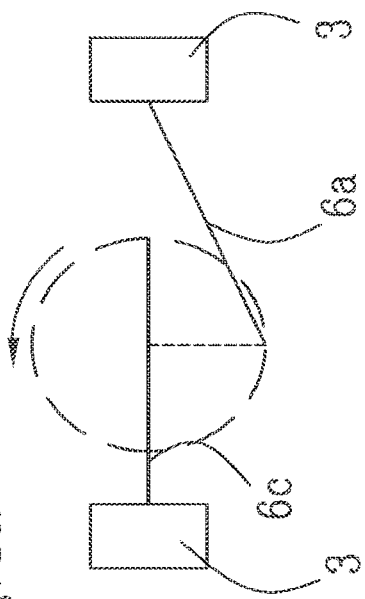
Figure 4D:
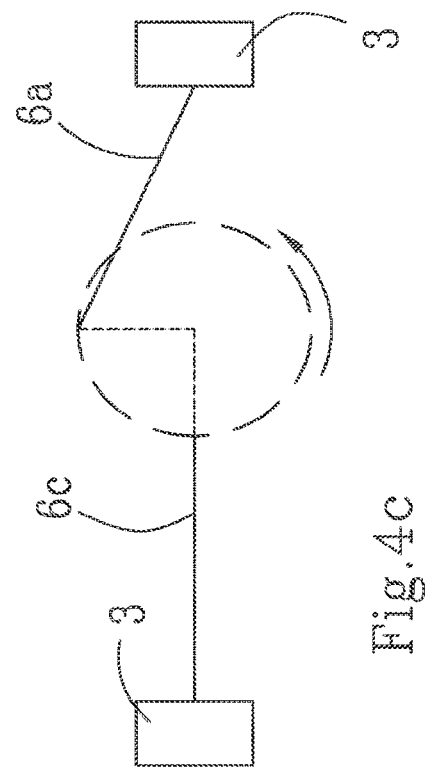

As shown in FIG. 2a, between the main carriage 2 and the auxiliary carriage 3 is interposed the actuating means 6, which once activated is able to induce the rotary motion of the plate 4 to which it is operatively associated. The main carriage 2 and the auxiliary carriage 3 define a linear motor with the guide 1 and can be translated along the advancement direction 1a of the guide 1 with not necessarily equal specific velocities due to the programming of the control unit 7, which manages position and velocity with great precision, as the mutual distance thereof can be varied by activating the operation of the actuating means 6 for the consequent rotation of the plate 4. FIG. 2b illustrates that the guide includes a parallel tracks and that a main carriage is arranged on a different track with respect to a relative auxiliary carriage in such a way that the latter can move alongside the main carriage.

As shown in FIG. 3a, the actuating means 6 is made up of a connecting rod-crank system, connected to both carriages, the main carriage 2 and the auxiliary carriage 3, and the plate 4.

The crank 6b is located on the main carriage 2 and the rotation axis thereof coincides with the main rotation axis 5 about which it is able to rotate the plate 4, to which it is operatively connected.

Instead, the connecting rod 6a has a first end 8a constrained to the auxiliary carriage 3 and a second end 8b connected to the crank 6b present on the main carriage 2. The variation of the relative distance between the main carriage 2 and the auxiliary carriage 3 activates the connecting rod-crank system, which in turn is able to impart the rotary motion to the plate 4.

Alternatively, FIG. 3b shows a different aspect of the invention, in which two auxiliary carriages 3 are present, associated to the same main carriage 2 interposed between them. Each auxiliary carriage 3 has a connecting rod 6a associated to a specific crank 6b present on the main carriage 2 and operatively connected to the plate 4. Also according to this aspect, the connecting rods 6a have a first end 8a constrained to the respective auxiliary carriage 3 and a second end 8b associated to the respective crank 6b. The cranks 6b are arranged in such a way that both the rotation axes coincide with one another and with the main axis 5 about which the plate 4 is able to rotate.

In order to obtain a fluid rotary motion of the plate 4, i.e. free of dead centres which might interfere with the rotation up to interrupting it, the two cranks 6b are arranged mutually offset by a non-zero angle less than 180°, preferably comprised between 45° and 135°, still more preferably 90°. In this way, when a connecting rod 6a and the respective crank 6b are in an aligned position, defining a dead centre of the mechanism, the other connecting rod 6a and the respective crank 6b will be misaligned and thus enable continuation of the movement in a fluid way. This movement is realized owing to the precise and continuous variation of the relative distance between the auxiliary carriages 3 and the main carriage 2 by the control unit 7, i.e. by the activation of the linear motors defined by the carriages independently of one another.

The control unit 7 is therefore configured to move the auxiliary carriage(s) 3 with respect to the main carriage 2 according to the rotation direction of the plate 4 and the required force.

FIGS. 4a to 4d illustrate, in a schematic top view, the succession of the movements carried out by the auxiliary carriages 3 with respect to the main carriage 2 (not illustrated but identifiable by the dashed centre of the circle), i.e. the variation of the mutual distance thereof with a consequent movement of the respective connecting rods 6a and the cranks 6b associated thereto for the rotation of the plate 4, in a counterclockwise direction according to FIGS. 4a to 4d.

Alternatively, according to another aspect of the invention, both auxiliary carriages 3 can be arranged upstream or downstream of the main carriage 2, with respect to the advancement direction 1a of the containers.

Further, according to a different aspect of the invention, the pair of cranks 6b present on the main carriage 2 can be replaced by a crankshaft 9, able to carry out the same function having the rotation axis thereof coinciding with the main axis 5 about which the plate 4 is able to rotate.

The operation of the machine 100 is described in the following and is independent of the embodying feature considered among those described in the foregoing.

The machine 100, according to the claims of the present patent application, is normally inserted in a broader context of a conveying system of containers in which each container is borne (by a guide 1, spacing means and input star) on a plate of the machine 100 which transports the container along the advancement direction 1a up to an outlet star for extracting the container from the machine 100 itself.

Along the advancement direction 1a, each container passes at various units each of which able to carry out different tasks, for example, initially the first device that encounters the container is a detecting device which samples the profile of the container in search for a recognition sign with respect to which the first label is to be applied, then the container encounters a first labelling unit which applies the first label and possibly other operating units with different purposes.

In addition to being moved along the advancement direction 1a of the guide 1, the container must also be set in rotation about a main axis 5 thereof, so that the operating station, stationary with respect to the guide 1, can carry out the functions for which it is programmed, such as the orientation and the application of labels.

It is to be noted that the control unit 7 is configured to move the auxiliary carriage(s) for rotation of the plate 4 before reaching the labelling machine so as to orientate the container in the correct direction for application of the label.

Once transferred by the input star onto the plate 4 of the main carriage 2 slidably mounted on the guide 1, the container is set in rotation by the actuating means 6 connected to the plate 4 itself.

The actuating means 6 is installed between a main carriage 2 and an auxiliary carriage 3, both slidably mounted on the guide 1 with which they define a pair of linear motors. The management of the linear motors by a control unit 7 enables translation along the advancement direction 1a also at different velocities, so as to vary the mutual distance thereof in order to be able to activate the actuating means 6 and thus induce the rotation of the plate 4.

Lastly the bottle is collected by the carriage from the outlet star and deposited on an outlet conveyor belt.

Any modifications or variants which, in the light of the description, are evident to the person skilled in the art, must be considered to fall within the scope of protection established by the present invention, according to considerations of technical equivalence.

The invention claimed is:

1. A machine for conveying containers, the machine comprising:
    a guide extending along an advancement direction of the containers;
    at least one main carriage for transporting containers slidably mounted on said guide, said guide and said main carriage together defining a main linear motor;
    at least one auxiliary carriage slidably mounted on said guide, said guide and said auxiliary carriage together defining an auxiliary linear motor;
    a plate for supporting the base of a container rotatably mounted on said main carriage and able to rotate about a main axis of the container;
    actuating means operatively connected to said plate and configured for setting said plate in rotation about said main axis of the container;
    a control unit electrically connected to said guide and configured for controlling the sliding of said main carriage and said auxiliary carriage on said guide and their mutual distance;
    wherein said actuating means comprises at least one connecting rod and at least one crank operatively connected to one another and interposed between said main carriage and said auxiliary carriage;
    said crank is mounted on said main carriage and is operatively connected to the plate so as to rotate the plate, and wherein said connecting rod has a first end constrained to said auxiliary carriage and a second end connected to said crank;
    said connecting rod and said crank being activatable following the variation of the mutual distance between said main carriage and said auxiliary carriage; said control unit being configured for commanding the variation of the mutual distance between the main carriage and the auxiliary carriage in such a way as to activate said actuating means;
    a further auxiliary carriage slidably mounted on said guide, said guide and said further auxiliary carriage together defining a further auxiliary linear motor, and wherein said actuating means comprises a further connecting rod and a further crank operatively connected to one another and interposed between said further auxiliary carriage and said main carriage;
    wherein said further crank is mounted on said main carriage and is operatively connected to the plate and wherein said further connecting rod has a first end constrained to said further auxiliary carriage and a second end connected to said further crank; said two cranks being arranged mutually offset by a non-zero angle less than 180°.

2. The machine according to claim 1, wherein said crank has a rotation axis coinciding with the main rotation axis about which the plate to which it is operatively connected rotates.

3. The machine according to claim 1, wherein said main carriage comprises said crank and said further crank arranged along a same rotation axis offset from one another by an angle of less than 180° and other than 0°.

4. The machine according to claim 3, further comprising a crankshaft operatively connected to the plate and formed by said crank and by said further crank.

5. The machine according to claim 3, wherein the angle is 90°.

6. The machine according to claim 1, wherein said main carriage is interposed between said auxiliary carriage and said further auxiliary carriage.

7. The machine according to claim 1, wherein said control unit is configured for maintaining the mutual distance between said main carriages constant and for varying the distance between each auxiliary carriage alternately between moving close and away with respect to the main carriage which is located downstream or upstream.

8. The machine according to claim 1, wherein said guide comprises two or more parallel tracks controllable independently, wherein a main carriage is arranged on a different track with respect to a relative auxiliary carriage in such a way that the relative auxillary carriage can move alongside the main carriage.

9. The machine according to claim 1, wherein said plate is axially fixed at least during the rotation about the main rotation axis.

* * * * *